United States Patent
Bureta et al.

(10) Patent No.: US 12,061,043 B2
(45) Date of Patent: Aug. 13, 2024

(54) CONTACT FREEZING WITH DUAL PRODUCT TRANSPORTATION SYSTEMS

(71) Applicant: John Bean Technologies Máquinas e Equipamentos Industriais Ltda., São Paulo (BR)

(72) Inventors: Alejandro C. Bureta, São Paulo (BR); Danilo M. da Silva, São Paulo (BR)

(73) Assignee: John Bean Technologies Máquinas E Equipamentos Industrias Ltda., São Paulo (BR)

( * ) Notice: Subject to any disclaimer, the term of this patent is extended or adjusted under 35 U.S.C. 154(b) by 415 days.

(21) Appl. No.: 16/826,031

(22) Filed: Mar. 20, 2020

(65) Prior Publication Data

US 2020/0318894 A1 Oct. 8, 2020

Related U.S. Application Data

(60) Provisional application No. 62/829,201, filed on Apr. 4, 2019.

(51) Int. Cl.
| | | |
|---|---|---|
| *F25D 31/00* | (2006.01) | |
| *A23L 3/36* | (2006.01) | |
| *F25D 13/06* | (2006.01) | |

(52) U.S. Cl.
CPC .............. *F25D 31/00* (2013.01); *A23L 3/361* (2013.01); *F25D 13/06* (2013.01); *A23V 2002/00* (2013.01)

(58) Field of Classification Search
CPC ......... B65G 35/04; F25D 31/00; F25D 13/06; A23L 3/361
See application file for complete search history.

(56) References Cited

U.S. PATENT DOCUMENTS

| | | | | |
|---|---|---|---|---|
| 2,612,851 A | * | 10/1952 | Morrison | A23G 3/0242 425/105 |
| 3,389,744 A | * | 6/1968 | Sullivan | F25D 31/001 165/263 |
| 5,951,895 A | | 9/1999 | Green et al. | |
| 6,006,536 A | | 12/1999 | Ochs | |
| 6,009,719 A | | 1/2000 | Ochs | |

(Continued)

FOREIGN PATENT DOCUMENTS

| | | |
|---|---|---|
| EP | 1649227 B1 | 1/2010 |
| SE | 1250280 A1 | 9/2013 |
| WO | 2015009212 A1 | 1/2015 |

OTHER PUBLICATIONS

Accurate Industrial, 3 Basic Conveyor Belt Tracking Rules to Follow (https://accurateindustrial.com/resources/articles/3-basic-conveyor-belt-tracking-rules-to-follow/), Whole Document (Year: 2023).*

*Primary Examiner* — Jerry-Daryl Fletcher
*Assistant Examiner* — Keith Stanley Myers
(74) *Attorney, Agent, or Firm* — Christensen O'Connor Johnson Kindness PLLC

(57) ABSTRACT

A freezer includes one or more cooling plates arranged into a table surface, wherein the freezer is configured to run either a closed loop film or a disposable film one at a time over the cooling plates; the closed loop film is provided on the freezer; and a disposable film of finite length is provided on the freezer while the closed loop film is on the freezer. The disposable film can be an alternate or backup to keep the freezer operating when the closed loop film needs repair.

7 Claims, 5 Drawing Sheets

(56) References Cited

U.S. PATENT DOCUMENTS

| | | | | |
|---|---|---|---|---|
| 6,012,293 | A | * | 1/2000 | Andersson ............ A23G 3/0273 |
| | | | | 62/345 |
| 6,370,886 | B1 | * | 4/2002 | Ochs .......................... F25C 5/00 |
| | | | | 62/320 |
| 9,254,062 | B2 | | 2/2016 | Wilson et al. |
| 9,739,520 | B2 | | 8/2017 | Miller et al. |
| 2013/0042889 | A1 | | 2/2013 | White et al. |
| 2013/0340631 | A1 | | 12/2013 | Blixt et al. |

* cited by examiner

CONTACT FREEZING WITH DUAL PRODUCT TRANSPORTATION SYSTEMS

CROSS-REFERENCE(S) TO RELATED APPLICATION(S)

This application claims the benefit of U.S. Provisional Application No. 62/829,201, filed Apr. 4, 2019. This application is expressly incorporated herein by reference.

BACKGROUND

"Crust freezing" is a well-known process in the food processing industry to harden product surfaces for posterior process treatment or to stabilize product surfaces to avoid damage on subsequent process operations. Conventional freezers have high operating costs due to elevated use of consumables or due to higher energy and utilities. Freezers can also be put out of service from breakdowns and routine maintenance.

Therefore, achieving high runtimes and low operating costs is a desirable goal which has eluded the freezer industry

SUMMARY

In one embodiment, a freezer 100 comprises: one or more cooling plates 106 arranged into a table surface 107, wherein the freezer is configured to run either a closed loop film 144 or a disposable film 146 one at a time over the cooling plates; the closed loop film is provided on the freezer; and a disposable film of finite length is provided on the freezer while the closed loop film is on the freezer.

In one embodiment, a path of the closed loop film 144 passes through a washer 122 and dryer 126, and a path of the disposable film 146 does not pass through the washer and dryer.

In one embodiment, the disposable film 146 is provided on the freezer in a roll 132.

In one embodiment, the freezer 100 comprises an infeed conveying section 110, a cooling conveying section 112, and an outfeed conveying section 114, and a path of the closed loop film 144 traverses the infeed and cooling conveying sections, and does not traverse the outfeed conveying section.

In one embodiment, the closed loop film 144 is glass fabric coated with poly(tetrafluoroethylene) and the disposable film 146 is polyethylene.

In one embodiment, the freezer 100 comprises a first speed controller for the disposable film 146 and a second speed controller for the closed loop film 144.

In one embodiment, the freezer 100 comprises an infeed conveying section 110 before a cooling conveying section 112 comprised from the cooling plates 106, wherein the closed loop film 144 traverses the infeed conveying section and the cooling conveying section.

In one embodiment, the freezer 100 comprises an outfeed conveying section 114 after a cooling conveying section 112 comprised from the cooling plates 106, wherein neither the closed loop film 144 nor the disposable film 146 traverse the outfeed conveying section.

In one embodiment, the freezer comprise an outfeed conveying section 114 after a cooling conveying section 112 comprised from the cooling plates 106, wherein a pervious or impervious conveyor 152 traverses the outfeed conveying section In one embodiment, a freezer 100, comprises: one or more cooling plates 106 arranged into a table surface 107, wherein the freezer is configured to run either a closed loop film 144 or a disposable film 146 one at a time over the cooling plates; a disposable film 146 of finite length is provided on the freezer, and the disposable film traverses the cooling plates; and wherein the closed loop film is not on the freezer when the disposable film traverses the cooling plates.

In one embodiment, the freezer 100 comprises a film washer 122 and film dryer 126, and a path of the disposable film 146 does not pass through the film washer and film dryer.

In one embodiment, the freezer 100 comprises an infeed conveying section 110 before a cooling conveying section 112 comprised from the cooling plates 106, wherein the disposable film 146 traverses the infeed conveying section and the cooling conveying section.

In one embodiment, the freezer 100 comprises an outfeed conveying section 114 after a cooling conveying section 112 comprised from the cooling plates 106, wherein the disposable film 146 does not traverse the outfeed conveying section.

In one embodiment, a method for crust-freezing products comprises: operating a freezer 100 by conveying products on a closed loop film 144 over cooling plates 106; removing the closed loop film from the freezer; threading a disposable film 146 of finite length on the freezer; and operating the freezer by conveying products on the disposable film over the cooling plates.

In one embodiment, the method for crust-freezing further comprises winding the disposable film 146 into a traction roller 140 after the disposable film is used in conveying products over the cooling plates 106.

In one embodiment, the method for crust-freezing further comprises removing the disposable film 146 from the freezer 100 and installing the closed loop film 144 on the freezer and resume conveying products on the closed loop film over the cooling plates.

In one embodiment, a method of making a freezer 100 comprises installing a roll 132 of disposable film 146 of finite length on a freezer 100 already comprising a closed loop film 144 that traverses cooling plates 106.

In one embodiment, the method of making the freezer 100 comprises installing a speed controller on the freezer, the speed controller configured to control the speed of the disposable film 146.

In one embodiment, the method of making the freezer 100 comprises installing a traction roller 140 on the freezer, the traction roller configured to wind up used disposable film 146.

A contact freezer 100 for food products comprising one conveying section 112 for thermal treatment of food having one or more of cooling plates 106, a second and third variable length conveying sections 110, 112 before and after the section for cooling of food products. A dual food product transportation system, having a first system using an endless closed loop film 144 which is assembled around the first and second conveying sections, which continuously circulates the closed loop film to provide transportation support for the food goods which crust-freeze as they travel over the cooling plates and a second system using a finite length disposable film 146 which is routed over the first and second conveying zones by having a feed roll 132 placed at the product infeed end of the freezer, and a traction roller 140 positioned at the product discharge end of the freezer, which collects the disposable film for disposal. The freezer allows the alternate use of a closed loop film or disposable film for food products transportation, adding redundancy and flexibility to the freezer.

In one embodiment, the invention provides the advantages of a continuous endless closed loop transportation system with the practicality of having a secondary transportation system that can be deployed quickly in case the first system fails. The benefit resides in the redundancy that is built in the combined solution, which furthermore enhances equipment uptime by reducing the time it takes to bring equipment back to operation if/when the continuous endless closed loop transportation system fails and allow users to postpone and plan maintenance intervention that would be required to repair the failed system.

This convenience and availability of the secondary transportation system supports enhanced operation control resulting in more production volumes overtime, which generate a positive performance differential, maximizing operation costs dilution, achieving higher revenues per operation period, and consequently higher processing line returns, making the adoption of the solution provided by the disclosed freezer more appealing to customers than prior art technologies that do not offer the redundancy generated by the invention.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

One of the recurring problems of continuous endless belt freezers is the substantial time it takes to repair or replace the belt and the ancillary subsystems that support the operation of the belt. Belt and ancillary equipment failures result in elongated down time, which is detrimental to food processors who want to have maximum line operating time to achieve high productivity, efficiency level which result in higher revenues and higher profits.

The industry has failed to address some of the disadvantages in comparison with the present disclosure. According to the present disclosure, a closed loop film contact freezer has a built-in backup disposable film system that makes it possible to switch from one system to another with little effort, and in short time allowing moving from a closed loop film transportation system to a finite length disposable film transportation system and revert back to the closed loop film at the user's discretion.

Figure 1:
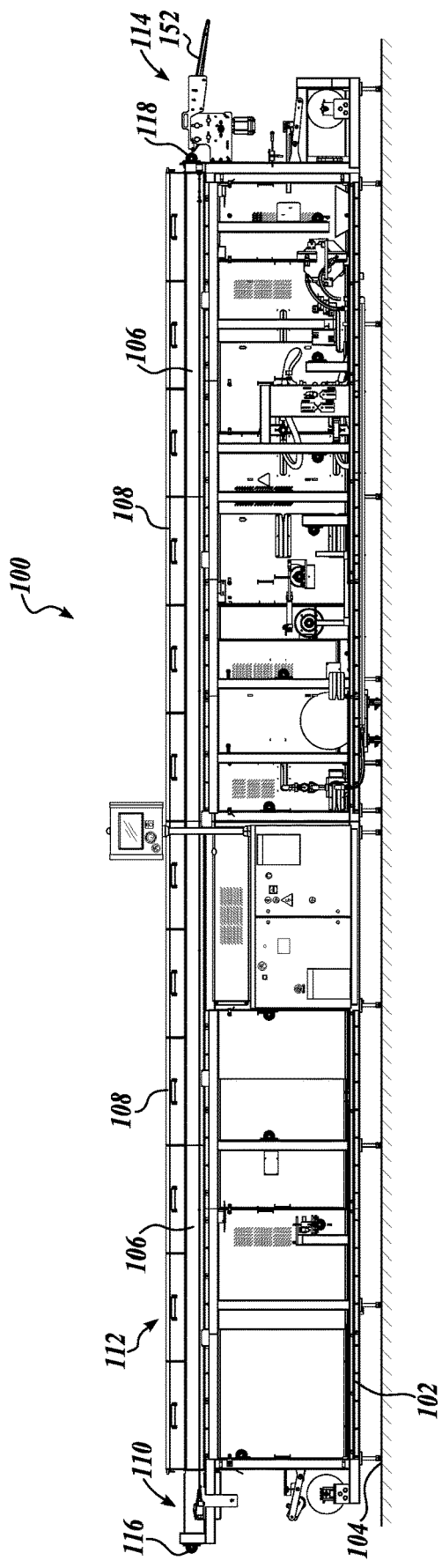
FIG. 1 is a diagrammatical illustration of a contact freezer without side panels.

FIG. 1 is an illustration of a contact freezer 100 in accordance with one embodiment of this disclosure. The contact freezer 100 includes a metal frame 102 supported by feet 104 along the length of the contact freezer 100. The freezer 100 can be built to any length and width to meet the intended application. The freezer 100 is constructed to use both a first or second product transportation system as further described. Both transportation systems carry products over a table of cooling plates to freeze the bottom of the products (i.e., crust-freezing). A first product transportation system uses a closed loop film (144, FIG. 3). The closed loop film 144 continually loops around the freezer 100 and is continually reused. The second product transportation system uses a disposable film (146, FIG. 4) of finite length having a beginning and an end. The disposable film is provided in a new unused infeed roll and after a single use, the disposable film is wound up in a used film roll which is then discarded.

Figure 2:
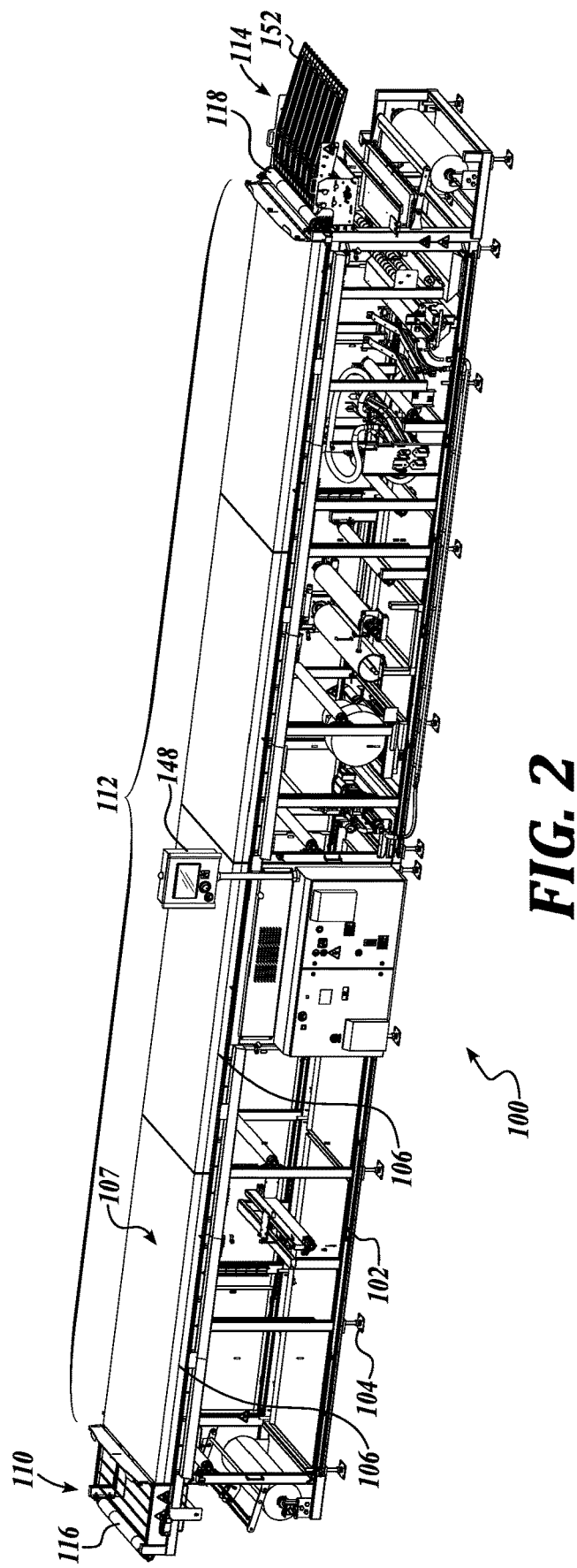
FIG. 2 is a diagrammatical illustration of the contact freezer of FIG. 1 without side panels and covers.

Referring to FIG. 2, the contact freezer 100 includes cooling plates 106 arranged along the length of the freezer 100. Refrigerant is used to cool stainless steel plates on which the closed loop film 144 and disposable film 146 travel. The cooling plates are stainless steel table plate having a cooling jacket where the refrigerant circulates to cool its surface. The cooling plates remove heat energy from the products. Cooling plates 106 can have an evaporator and condenser. The evaporator produces the cooling effect. The evaporator can be placed on the freezer 100 in contact with the steel plates that form the table top surface 107. The cooling plates 106 are used to cool or freeze a side of the food products, for example, for crust-freezing to stabilize the products for further processing, such as cutting and complete freezing. With a crust, the products are able to be transported on metal conveyors without sticking. The top surfaces of the cooling plates 106 together can make the flat table top surface 107. The cooling plates 106 are generally arranged sequentially along the length of the freezer 100 and the top steel surfaces are flush with each other to provide a smooth surface to allow one of the two films to pass above and in contact with the cooling plates 106. The cooling effect is transferred from the cooling plates 106 through one of the two films to the products. The films described herein are flexible, thin films known for use in conveying food products over cooling plates to freeze or harden a surface, usually only on one side of the product. Without being limited, the disposable film 146 can be polyethylene and be about 20 microns in thickness, for example; and the closed loop film 144 can be a glass fabric coated with a fluoropolymer, such as poly(tetrafluoroethylene) and be 200-300 microns in thickness, for example.

A user of the freezer 100 can use either one of the two films 144, 146 depending on the status of the freezer 100. For example, the closed loop film system of FIG. 3 uses several subsystems that are not used with the disposable film. Therefore, when a subsystem belonging to the closed loop film system breaks down or requires maintenance, the user can configure the freezer 100 to run with the disposable film 146 as shown in FIG. 4 while repairs are made to the closed loop film system. In one embodiment, the freezer 100 runs on the closed loop film system, while the disposable film system remains idle. In one embodiment, the freezer 100 runs on the disposable film system, while the closed loop film system remains idle.

In one embodiment, the freezer 100 includes three sections for conveying products. Referring to FIGS. 1 and 2, the first section is the infeed conveying section 110. The infeed conveying section 110 does not have cooling plates or a cover associated with it. The infeed conveying section 110 supports the films 144, 146. The infeed conveying section 110 is equipped with the infeed roller 116 that extends the films 144, 146 from the cooling conveying section 112 so that products can be loaded onto the films 144, 146.

The infeed conveying section 110 can be used for loading the products. There can be an offloading conveyor (not shown) that can load products to the infeed conveying section 110.

The freezer 100 includes a second cooling conveying section 112 for conveying products through the cooling plates 106. The products are transported either by the first closed loop film 144 or the disposable film 146, but not by both at the same time. Both the closed loop film 144 and the disposable film 146 cannot run on the cooling conveying section 112 at the same time. The products lie on top of the film in the same way as a belt conveyor, and the bottom side of the film contacts the cooling plates 106. The products do not make physical contact with the cooling plates 106, because the products are separated by the film. The second conveying section 112 for cooling can comprise the vast majority of the length of the freezer 100. The second conveying section 112 can be protected by the covers 108 (FIG. 1). The covers 108 protect the products and minimize humid air from condensing on the films 144, 146 and cooling plates 106. The covers 108 should be opened during cleaning, drying and defrosting and when replacing the closed loop film.

The freezer 100 includes a third conveying section 114 for conveying products after the products leave the second conveying section 112, after the products have been provided with a thin frozen crust. The third conveying section 114 is an outfeed section to convey products to other processing machines. When products exit the cooling conveying section 112 they are transferred to an outfeed conveyor 152. The outfeed conveying section 114 can be equipped with an independent frequency converter and can operate in speeds that are different from that of the films 144, 146. Both the closed loop film 144 and the disposable film 146 can convey products in the first infeed and second cooling sections 110, 112. Both the closed loop film 144 and the disposable film 146 may not convey products in the third outfeed section 114. Instead, the separate outfeed conveyor 152 is installed for the third outfeed section 114. Because the products leave the second cooling section 112 with a bottom frozen crust, the conveyor 152 in the third section 114 can be a metal or plastic conveyor 152 with pervious or impervious construction. For example, once the products have been stabilized by forming a thin frozen crust on one side, the products can be transported on open chain link or mesh style conveyors without sticking. Additionally, the conveyor 152 of the third outfeed section 114 can also run at a different speed than the first closed loop film 144 and second disposable film 146 run in the infeed and cooling sections 110, 112. By running the conveyor 152 of the third outfeed section 114 at a higher speed, the spacing between products may be increased. Conversely, running the conveyor 152 of the outfeed section 114 at a slower speed with respect to the film in the cooling section 112, will decrease the spacing between products.

In one embodiment, a separate conveyor may be used in the first infeed section 110, and the first closed loop film 144 and the second disposable film 146 only run through the second cooling section 112.

Figure 3:
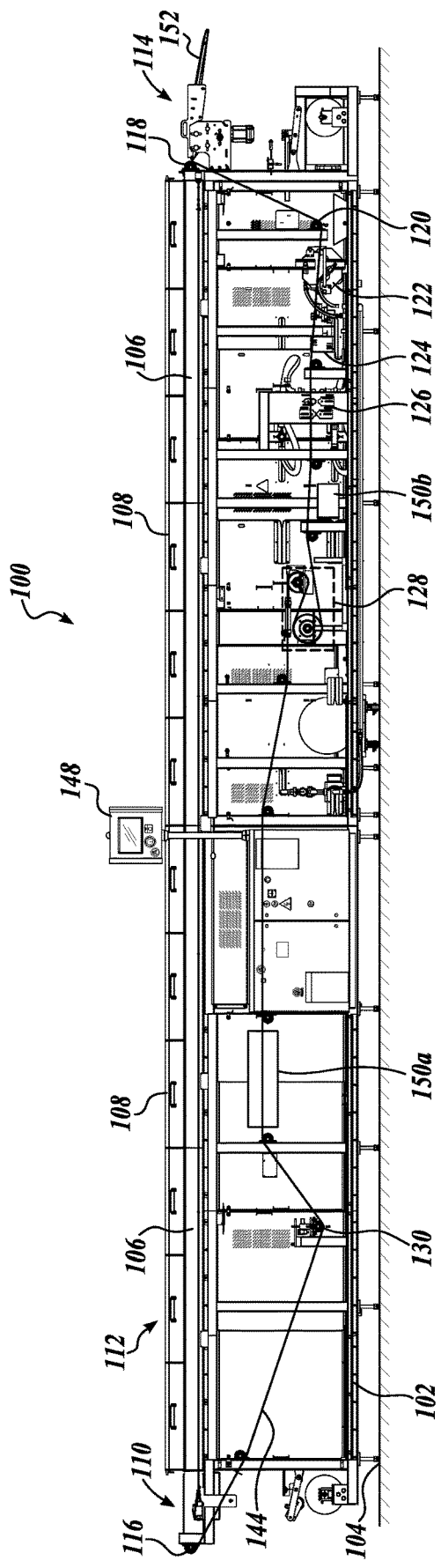
FIG. 3 is a diagrammatical illustration of the contact freezer of FIG. 1 using the closed loop film transportation system.
Figure 4:
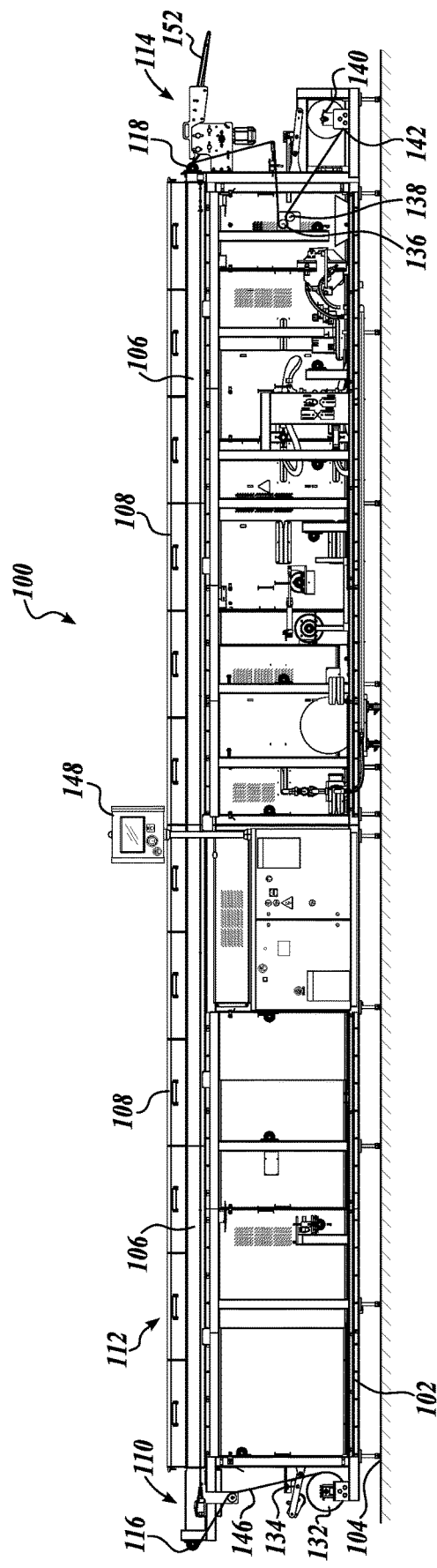
FIG. 4 is a diagrammatical illustration of the contact freezer of FIG. 1 using the disposable film transportation system.

In the illustrated embodiment of FIGS. 3 and 4, the first closed loop film 144 and the second disposable film 146 are configured to run through the infeed and cooling sections 110, 112. In one embodiment, the first closed loop film 144 and the second disposable film 146 are configured to run through the infeed and cooling sections 110, 112 only one at a time. The freezer 100 is basically configured to segregate the closed loop film system from the disposable film system. However, when either of the films is used the path for the first closed loop film 144 and the second disposable film 146 is the same through the infeed and cooling sections 110, 112. Both the first closed loop film 144 and the second disposable film 146 will pass over the first infeed roller 116 defining the start of the infeed section 110 and pass over the second exit roller 118 defining the end of the cooling section 112. The first closed loop film 144 arrives at the first infeed roller 116 from a different place than the disposable film 146, and after leaving the second exit roller 118, the first closed loop film 144 is routed to a different place than the second disposable film 146.

Referring to FIG. 3, the path of the first closed loop film 144 will be described. The closed loop film 144 is a long-lasting film that demands little maintenance and runs continuously through the film path. The closed loop film 144 is an endless loop so it continually passes and is reused over the infeed and cooling sections 110, 112 until the user decides to take off the closed loop film 144 and run the freezer 100 with the disposable film 146. Because the closed loop film 144 comes in contact with food product, the closed loop film 144 is continually cleaned.

After transporting products through the infeed and cooling sections 110, 112, the closed loop film 144 passes by a debris scraper 120. The scraper 120 that precedes the cleaning system removes the thicker layer of ice and product debris.

From the debris scraper 120, the closed loop film 144 passes by a film washer 122. The film washer 122 is equipped with multiple water spray nozzles in order to further clean product debris from the film 144.

From the film washer 122, the closed loop film 144 passes by a film scraper/water remover 124. Non-toxic silicone scrapers can be used to remove the excess water from the closed loop film 144. The film scraper 124 for water removal is located after the film washer 122.

From the film scraper 124, the closed loop film 144 passes by a film dryer 126. The film dryer 126 forces hot air onto the closed loop film 144 to ensure there is no remaining moisture or water droplets left on the closed loop film 144 in preparation for the next freezing cycle.

From the film dryer 126, the closed loop film 144 passes by the take-up and drive unit 128. The take-up and drive unit 128 is comprised of two rollers, a tension adjusting roller and a drive roller. The closed loop film 144 tension is adjusted by a roller mechanically linked to a pneumatic system that places tension on the closed loop film 144 to absorb any possible film dimension variations due to thermal expansion or shrinkage. The drive roller is a silicone covered roller which maintains continuous friction between the closed loop film 144 and the roller. The working speed of the closed loop film 144 is adjusted from the control panel 148.

From the take-up and drive unit 128, the closed loop film 144 passes by a film aligning system 130. The film aligning system 130 includes belt guides to assure that the closed loop film 144 stays in position and guides the closed loop film 144 sideways. The film aligning system 130 is equipped with infrared tracking sensors and actuators that keep the closed loop film laterally aligned. Once the sensors detect a misalignment, the lateral actuators are activated until the closed loop film 144 is realigned laterally.

From the film aligning system 130, the closed loop film 144 is routed to the infeed roller 116 to continually convey products across the first infeed section 110 and the cooling section 112.

In another embodiment, depicted on FIG. 3, there may be a sanitizing system 150*a* or 150*b* that applies a chemical sanitizer in liquid state to the underside surface of the closed loop film 144, by asperging/spraying sanitizer onto the film surface by means of atomizing spray nozzles.

Alternatively, the sanitizing system 150*a* or 150*b* can include an enclosed shroud around the closed loop film 144 path, where ultra-violet germicidal irradiation, which uses short-wave length ultraviolet (UV-C) light to kill or inactivate microorganisms. The enclosed chamber/shroud aims to contain the ultraviolet light which can be detrimental to people's skin tissues.

Any of the above described sanitizing systems could be located in the area 150*a* between the take-up and drive unit 128 and the film aligning system 130 or in the area 150*b* between the film dryer 126 and the take-up and drive unit 128.

Figure 5:
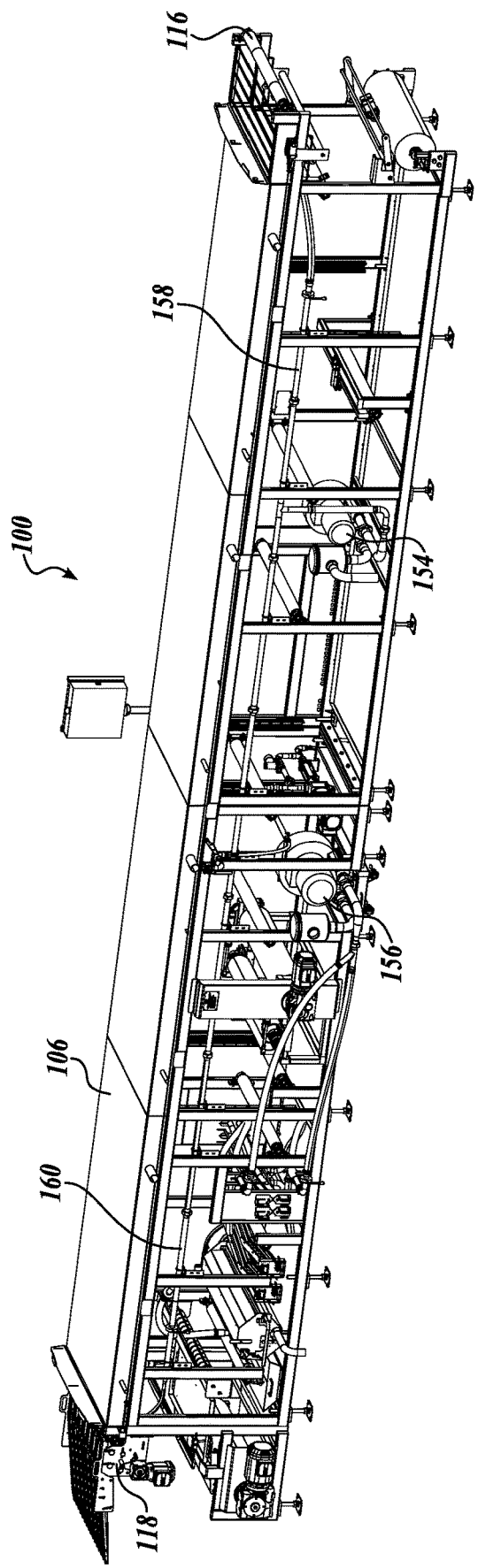
FIG. 5 is a diagrammatical illustration of the contact freezer of FIG. 1 including a hot air blower system.

In another embodiment, depicted in FIG. 5, an additional air blower 154 can be provided on the freezer 100 for use with the closed loop film 144. A first air blower 156 is part of the dryer 126. The second air blower 154 can force heated air onto the bottom side of the continuous closed loop film 144. The blowing of air on the bottom side (the side not in contact with product) of the closed loop film 144 can be accomplished by placing one or more air vents positioned to direct the air onto the bottom side of the closed loop film 144. For example, air vents can be placed in proximity to the infeed roller 116 and in proximity to the exit roller 118. The air vents are provided air by air conduits 158 and 160. This is to ensure that the film 144 is dry before it again reaches the cooling plates 106. An advantage is provided if water droplets are prevented from reaching the cooling plates 106 where the water can turn into ice crystals or ice balls, which can protrude through the continuous belt cloth and initiate tears that can lead to belt failure if not patched.

In an embodiment, the air blower 154 can provide warm air ranging from 20-30° C. onto the exit roller 118, aiming to keep it above 0° C. to prevent moisture turning into frost and preventing the build-up of ice on the exit roller 118. Uneven ice build-up is caused by the continuous film which reaches the exit roller 118 being at temperatures below the freezing point of water after having traveled over the cooling plates 106. When ice builds up on the exit roll unevenly, it causes the continuous belt 144 to drift sideways increasing the chance of collision between the continuous belt and stationary parts of the equipment.

The above-described ancillary subsystems can be for the closed loop film 144 transportation system. In addition, the closed loop film 144 passes through numerous directional rollers throughout the path described. The disposable film 146 transportation system does not use or need not rely on the subsystems numbered 120, 122, 124, 128, 130, and 154.

Referring to FIG. 4, the path of the second disposable film 146 will be described. The disposable film is not an endless loop so it only passes once over the infeed and cooling sections 110, 112. The disposable film 146 is of finite length. The disposable film 146 can be supplied new in rolls 132 and discarded as used rolls. When the disposable film 146 is used up, a new roll needs to be added to the freezer 100.

A roll 132 of new disposable film 146 can be provided in the area of the infeed section 110. In one embodiment, the roll 132 is attached to the lower section of the freezer 100 and is not covered so as to make loading of the roll 132 easier and convenient. The roll 132 is held in place by spindles and ready to be wound over the infeed roller 116 through the infeed and cooling sections 110, 112 when the closed loop film 144 is removed.

From the roll 132, the disposable film 146 passes over an infeed stretcher roller 134. From the stretcher roller 134, the disposable film 146 passes over the infeed roller 116. From the infeed roller 116, the disposable film 146 is passed through the infeed and cooling sections 110, 112. After exiting the cooling section 112, the disposable film 146 is passed over the exit roller 118. From the exit roller 118, the disposable film 146 is passed over a pair of stretcher rollers 136, 138. The infeed stretcher roller 134 and the outfeed stretcher rollers 136, 138 on the infeed and outfeed sides help to add tension to the disposable film 146 once each bend or turn the disposable film 146 makes adds tension to it. The stretcher rollers 134, 136, and 138 also have a secondary function of stretching the disposable film 146 laterally, which is aimed at avoiding or minimizing wrinkling of the disposable film 146 as it travels. The rollers 136, 138 on the discharge side can have a coat of rubber and have a spiraled groove carved on their surface, which "stretches" the disposable film 146 out toward its edges.

From the stretcher rollers 136, 138, the disposable film 146 is directed to the traction roller 140 (seen covered with used film). The disposable film 146 does not slip on the traction roller 140, so the disposable film becomes wound around the traction roller 140. The traction roller 140 is powered by a gearmotor 142. The gearmotor 142 can have a variable frequency driver (VFD) to control the rate of linear speed of the disposable film. The speed sensor for controlling the speed of the disposable film 146 uses an encoder attached to the rotating wheel in contact with the new film roll. Such wheel turns as the film unwinds. The disposable film system uses an inductive sensor which counts pulses generated by holes located on the rotating wheel sidewall.

The operation of the freezer with the disposable film 146 will be different from the closed loop film 144. While the closed loop film 144 relies on an aligning system 130, the disposable film 146 does not use the aligning system 130. However, the disposable film 146 may want to track to one side or the other. To align the disposable film 146, the infeed roller 116 or the exit roller 118 can be adjusted or both. The rollers 116 and 118 can be adjusted on one or both lateral sides in or out. Adjusting by moving the rollers out on one side will make the disposable film 146 track towards the other side.

Each of the two conveying films 144, 146 has dedicated sub-systems that do not work, or are not used when the other film is in use. This is so that the disposable film system can be redundant to the closed loop film system and vice versa. However, both systems can be controlled from a common human machine interface 148 (HMI). The operation of the freezer 100 is controlled and monitored from the HMI 148. Holding time/film speed, temperatures, and a number of other variables are shown on the HMI 148. An electrical cabinet can be equipped with the HMI 148, main switch, attention siren and emergency stop button.

The freezer 100 is constructed so that the ancillary sub-systems belonging to each of the closed loop film 144 and disposable film 146 conveying systems is located in such a way that they do not need to be altered or removed when the user decides to convert from one system to the other. It should be clear that the disposable film 146 should not be simultaneously installed over the infeed and cooling sections 110, 112 while the closed loop film 144 is on the freezer 100. In practice, one film has to be removed before the other can be installed to alternate the conveying film configuration. The changeover to disposable film is fairly quick, once it only requires installing a new roll, pulling the film thru the film path and attaching it to the traction roll on the discharge end. The reverse change over from the disposable film to the closed loop film may take longer. Once the closed loop film is routed around the equipment on the defined film, it is necessary to seam the film using a heat welding process.

Disclosed is a contact freezer 100 for food products comprising one section 112 for thermal treatment of food having one or more of cooling plates 106, a second and third variable length infeed and outfeed sections 110, 114 before and after the cooling section 112, where the infeed and outfeed sections 110, 114 are used to support the product and do not exchange heat with the food products. A first product transportation system for food products which travels over the infeed and cooling sections 110, 112, comprising a continuous impervious film 144 which forms an endless loop establishing a closed path where the film 144 circulates indefinitely defining the continuous use of the film 144 surface to transport food products as it recirculates. A second alternate product transportation system for food products which travels over the infeed and cooling sections 110, 112, comprising a finite length impervious film 146, arranged in a non-continuous open loop, which is positioned between a feed roll 132 at the infeed section 110 of the freezer, and a traction roller 140 positioned at the outfeed section 114 of the freezer, with the film 146 passing over the infeed and cooling sections 110, 112, accumulating in the traction roller 140, which provides traction and winds the film 146, collecting it for disposal.

In one embodiment, the freezer 100 is operated solely as a contact freezer to crust-freeze one side of the products. In other embodiment, the freezer 100 can additionally include other cooling systems. In one embodiment, the freezer 100 further includes a cold air impingement system to impinge cold air on the top side of products. Such cold air would help to increase the efficiency of the contact freezing. The cold air may also be impinged on the top sides of the films without products or from the bottom sides of the films, helping to accelerate the freeze-crusting around the edges of the products. In another embodiment, it would be possible to develop top and bottom side cold air impingement around the films, but the cooling plates would have to be perforated or interspersing cooling plates with open spaces and supports across the open spaces with transverse rods or rollers that would leave enough open space for the cold air to hit the film from below. In this case, the cold air would be directed onto the product surface from the top, but onto the bottom side of the continuous film from below.

In one embodiment, a freezer 100 comprises: one or more cooling plates 106 arranged into a table surface 107, wherein the freezer is configured to run either a closed loop film 144 or a disposable film 146 one at a time over the cooling plates; the closed loop film is provided on the freezer; and a disposable film of finite length is provided on the freezer while the closed loop film is on the freezer.

In one embodiment, a path of the closed loop film 144 passes through a washer 122 and dryer 126, and a path of the disposable film 146 does not pass through the washer and dryer.

In one embodiment, the disposable film 146 is provided on the freezer in a roll 132.

In one embodiment, the freezer 100 comprises an infeed conveying section 110, a cooling conveying section 112, and an outfeed conveying section 114, and a path of the closed loop film 144 traverses the infeed and cooling conveying sections, and does not traverse the outfeed conveying section.

In one embodiment, the closed loop film 144 is glass fabric coated with poly(tetrafluoroethylene) and the disposable film 146 is polyethylene.

In one embodiment, the freezer 100 comprises a first speed controller for the disposable film 146 and a second speed controller for the closed loop film 144.

In one embodiment, the freezer 100 comprises an infeed conveying section 110 before a cooling conveying section 112 comprised from the cooling plates 106, wherein the closed loop film 144 traverses the infeed conveying section and the cooling conveying section.

In one embodiment, the freezer 100 comprises an outfeed conveying section 114 after a cooling conveying section 112 comprised from the cooling plates 106, wherein neither the closed loop film 144 nor the disposable film 146 traverse the outfeed conveying section.

In one embodiment, the freezer comprise an outfeed conveying section 114 after a cooling conveying section 112 comprised from the cooling plates 106, wherein a pervious or impervious conveyor 152 traverses the outfeed conveying section In one embodiment, a freezer 100, comprises: one or more cooling plates 106 arranged into a table surface 107, wherein the freezer is configured to run either a closed loop film 144 or a disposable film 146 one at a time over the cooling plates; a disposable film 146 of finite length is provided on the freezer, and the disposable film traverses the cooling plates; and wherein the closed loop film is not on the freezer when the disposable film traverses the cooling plates.

In one embodiment, the freezer 100 comprises a film washer 122 and film dryer 126, and a path of the disposable film 146 does not pass through the film washer and film dryer.

In one embodiment, the freezer 100 comprises an infeed conveying section 110 before a cooling conveying section 112 comprised from the cooling plates 106, wherein the disposable film 146 traverses the infeed conveying section and the cooling conveying section.

In one embodiment, the freezer 100 comprises an outfeed conveying section 114 after a cooling conveying section 112 comprised from the cooling plates 106, wherein the disposable film 146 does not traverse the outfeed conveying section.

In one embodiment, a method for crust-freezing products comprises: operating a freezer 100 by conveying products on a closed loop film 144 over cooling plates 106; removing the closed loop film from the freezer; threading a disposable film 146 of finite length on the freezer; and operating the freezer by conveying products on the disposable film over the cooling plates.

In one embodiment, the method for crust-freezing further comprises winding the disposable film 146 into a traction roller 140 after the disposable film is used in conveying products over the cooling plates 106.

In one embodiment, the method for crust-freezing further comprises removing the disposable film 146 from the freezer 100 and installing the closed loop film 144 on the freezer and resume conveying products on the closed loop film over the cooling plates.

In one embodiment, a method of making a freezer 100 comprises installing a roll 132 of disposable film 146 of finite length on a freezer 100 already comprising a closed loop film 144 that traverses cooling plates 106.

In one embodiment, the method of making the freezer 100 comprises installing a speed controller on the freezer, the speed controller configured to control the speed of the disposable film 146.

In one embodiment, the method of making the freezer 100 comprises installing a traction roller 140 on the freezer, the traction roller configured to wind up used disposable film 146.

While illustrative embodiments have been illustrated and described, it will be appreciated that various changes can be made therein without departing from the spirit and scope of the invention.

The embodiments of the invention in which an exclusive property or privilege is claimed are defined as follows:

1. A freezer, comprising:
    one or more cooling plates arranged into a table surface, wherein the freezer is configured to run either a closed loop film or a disposable film one at a time over the cooling plates;
    an infeed roller is placed before the cooling plates, and an outfeed roller is placed after the cooling plates;
    a closed loop film transportation system for a closed loop film includes the infeed roller, followed by the cooling plates, followed by the exit roller, and after the exit roller and before the infeed roller are, a tension-adjusting roller, a drive roller, a film washer, and a film dryer; and
    a disposable film transportation system for the disposable film includes a disposable film roll, the disposable film passes over a stretcher roller, followed by the disposable film passing over the infeed roller, followed by the disposable film passing over the cooling plates, followed by the disposable film passing over the exit roller, followed by the disposable film passing over a at least one stretcher roller, followed by the disposable film wound on a traction roller powered by a motor.

2. A method for crust-freezing products via a freezer having a first product transportation system and a second product transportation system, comprising:
    conveying products on a closed loop film using the first product transportation system including passing the closed loop film on an infeed roller, followed by passing the closed loop film over cooling plates, followed by passing the closed loop film over an exit roller, and after the exit roller and before the infeed roller, the closed loop film passes over a tension-adjusting roller, a drive roller, a film washer, and a film dryer;
    followed by removing the closed loop film;
    followed by installing a disposable film roll;
    followed by conveying products on the disposable film using the second product transportation system including passing the disposable film over a stretcher roller, followed by passing the disposable film over the infeed roller, followed by passing the disposable film over the cooling plates, followed by passing the disposable film over the exit roller, followed by passing the disposable film over a at least one stretcher roller, followed by winding the disposable film on a traction roller powered by a motor.

3. The method of claim 2, further comprising removing the disposable film from the freezer and installing the closed loop film on the freezer and resume conveying products on the closed loop film over the cooling plates.

4. The freezer of claim 1, wherein the first product transportation system further comprises a debris scraper before the film washer.

5. The freezer of claim 4, wherein the first product transportation system comprises the infeed roller, followed by the cooling plates, followed by the exit roller, followed by the debris scraper, followed by the film washer, followed by the film dryer, followed by the drive and tension-adjusting rollers.

6. The freezer of claim 1, further comprising a human machine interface configured to control a speed of the disposable film.

7. A freezer, comprising:
    one or more cooling plates arranged into a table surface, wherein the freezer is configured to run either a closed loop film or a disposable film one at a time over the cooling plates;
    an infeed roller is placed before the cooling plates, and an outfeed roller is placed after the cooling plates;
    a first product transportation system includes the infeed roller, followed by the cooling plates, followed by the exit roller, and after the exit roller and before the infeed roller are at least a drive roller; and
    a second product transportation system for the disposable film includes a disposable film roll, the disposable film passing over the infeed roller, followed by the disposable film passing over the cooling plates, followed by the disposable film passing over the exit roller, followed by the disposable film wound on a traction roller powered by a motor, wherein the drive roller is not included in the second product transportation system.

* * * * *